United States Patent [19]

Johnson

[11] Patent Number: 4,699,316
[45] Date of Patent: Oct. 13, 1987

[54] ENERGY EFFICIENT HEATING SYSTEM FOR GREENHOUSES

[75] Inventor: Arthur C. W. Johnson, Troy, Mich.

[73] Assignee: Combustion Research Corporation, Pontiac, Mich.

[21] Appl. No.: 881,288

[22] Filed: Jul. 2, 1986

Related U.S. Application Data

[62] Division of Ser. No. 713,794, Mar. 20, 1985.

[51] Int. Cl.[4] ............................................. F24D 5/10
[52] U.S. Cl. .................................. 237/69; 237/1 R; 126/92 AC; 126/92 B; 47/17
[58] Field of Search .......... 126/427, 430, 419, 92 AC, 126/92 B, 132; 237/70, 50, 69; 47/17

[56] References Cited

U.S. PATENT DOCUMENTS 2,622,587  12/1952  Dupler ............................. 126/132
4,390,125   6/1983  Rozzi ............................... 237/70

OTHER PUBLICATIONS

Combustion Research, Reflect-o-Ray Radiant Heating at Green Gardens, Mar. 30, 1984.

*Primary Examiner*—Henry A. Bennet
*Attorney, Agent, or Firm*—Krass & Young

[57] ABSTRACT

An energy efficient system for controlling the environment in a greenhouse. The system includes an infrared heater, having a burner, a heat disbursement means and an exhaust means, and a layer of reflective and insulative material selectively deployable below the roof and inside the walls of the greenhouse to retain heat within the greenhouse, to prevent excess heat from the sun from entering the greenhouse and to reflect light into the greenhouse from the sun. The system also includes an air-to-water heat exchanger, connected at the exhaust end of the heater, that transfers heat from the heater's exhaust to water used in the greenhouse. The heated water is stored in an underground tank. A series of connected pipes, in communication with the tank, are set into the floor of the greenhouse to circulate the water through the floor to remove excess heat from the water.

7 Claims, 3 Drawing Figures

ENERGY EFFICIENT HEATING SYSTEM FOR GREENHOUSES

This application is a division of application Ser. No. 713,794, filed Mar. 20, 1985.

TECHNICAL FIELD

This invention relates to a heating system for greenhouses and, more particularly, to heating systems which include infrared heating units in conjunction with insulative and reflective materials.

BACKGROUND OF THE INVENTION

In order to grow plants in greehouses, a proper combination of light and heat is required. At times, the requisite light and heat are provided naturally from the sun. However, in most northern climates, it is often too cold during the winter to grow plants without some source of heat. Typically, heat is provided using forced air heaters. This does not prove to be entirely satisfactory, however, because much of the hot air is lost through the roof and walls of the greenhouse. As a result, during the winter days, the temperature in the greenhouse can be as low as 50° F. even with the hot air heaters at full blast.

One solution to this problem has been to use insulating materials on the roof and walls of the greenhouse. Systems of this type are disclosed in U.S. Pat. Nos. 4,064,648 to Cary, 4,313,650 to Ward et al. and 4,375,232 to Heescher et al.

Carry discloses use of a flexible sheet of insulating material, wound in a roll, that can be installed near the roof of the greenhouse. The material can then be deployed at night to cover the roof and prevent heat loss. During the daytime, the insulation is retracted into the roll so that light may enter the greenhouse.

A similar system is disclosed in the Heescher patent. There, an insulative foil, made of two layers of plastic separated by air pockets, is selectively deployed over the roof and walls of the greenhouse to prevent heat loss. The foil is folded when stored and opens to form an insulative barrier. Both the Heescher and Cary references suggest that the foil might be coated with aluminum to increase the insulation effect.

In Ward et al., reflective and insulative slats are arranged venitian blind style below the greenhouse roof. This construction permits selective capture or reflection of heat or light.

Aluminized insulating materials, such as those disclosed in the Heescher et al. and Cary references, are also useful in summer months to prevent overheating from direct sunlight. By deploying the insulating material over the southern exposure of the greenhouse (in the Northern hemisphere), direct sunlight will be reflected out of the greenhouse. Diffuse light still enters the greenhouse through the northern exposure providing light for the plants.

While hot air systems, used in conjunction with insulating materials, can be effective in promoting plant growth during cold winter months, such systems are still relatively energy inefficient. One primary drawback to the use of forced air is that the hot air naturally rises to the roof. Thus, the plants do not receive the full benefit of the forced air output. Although the insulating layers prevent much of the heat from escaping, the air near the roof will be warmer than the air near the floor, an indication that the system is not energy efficient.

Greenhouses also require large amounts of water. The water is often taken straight from the outside and sprayed on the plants. This water is very cold, especially in winter and, when sprayed on the plants, it cools the plants, soil and surrounding air. Thus, the environment must be reheated to maintain proper growing conditions. In order to maintain a steady temperature in the greenhouse, the water is sometimes heated before spraying. This is typically accomplished using a large capacity water heater. Thus, separate air and water heating systems must be purchased and installed. The water heating systems in the prior art are not able to take advantage of the excess heat produced by the air heating systems and so efficiency is not maximized.

Further problems arise due to the build-up of snow and ice on the roof above the insulating material. The prior art has attempted to solve this problem using additional devices which either scrape off the snow or heat the roof. None of the additional devices make use of the excess heat in the heating system, however, so, again, maximum efficiency is not achieved.

SUMMARY OF THE INVENTION

It is a primary object of the invention to provide a highly energy efficient system for greenhouses. This is accomplished by using an infrared heating system in the greenhouse in combination with one or more energy saving devices. In the peferred embodiment of the invention, an infrared heating system is used in combination with insulative and reflective foil which can be selectively deployed over the walls or roof of the greenhouse. Spray-type water heaters, using exhaust gases from the infrared heating system, are also employed to heat the water before spraying. The hot exhaust air from the burner is used to heat the gutters allowing snow and ice to melt and be carried away.

The infrared heater comprises an energy-emitting conduit extending at least partly through the greenhouse. A burner is connected at one end of the conduit to inject thermal energy into it. The other end of the conduit serves to exhaust the products of combustion from the burner to the air outside the greenhouse. Infrared heaters of this type are disclosed in my U.S. Pat. No. 4,044,751 incorporated herein by reference. To further maximize the efficiency of the system, water pipes are installed in the concrete floor of the greenhouse to ensure even heating of the greenhouse floor and also to provide a mechanism for maintaining the heated water at the proper temperature for use on the plants. The water conduits in the floor might also be used to or other purposes, e.g. collect and store solar energy during the summer months.

The primary advantage of the system disclosed herein is that overall efficiency of the heating system is approximately 97–98%. Thus, the system provides a highly energy efficient means of heating and operating a greenhouse through the cold months of the year.

Another advantage of the system is that no additional energy source is required to heat the water used for watering the plants.

A further advantage of the system is that the insulative and reflective foil can be deployed in various ways in the greenhouse depending on the season and the time of day. For example, at night, the roof and walls may be covered to trap heat within the greenhouse. During the daytime in the winter, the northern roof can be covered to reflect light into the greenhouse which would otherwise pass through the roof of the greenhouse. In the summer, during the day, the foil can be deployed on the southern exposure to reflect excess heat away from the greenhouse.

These and other advantages of the greenhouse heating system will become apparent upon reading the detailed description of the invention in conjunction with the drawings.

DETAILED DESCRIPTION OF THE INVENTION

Figure 1:
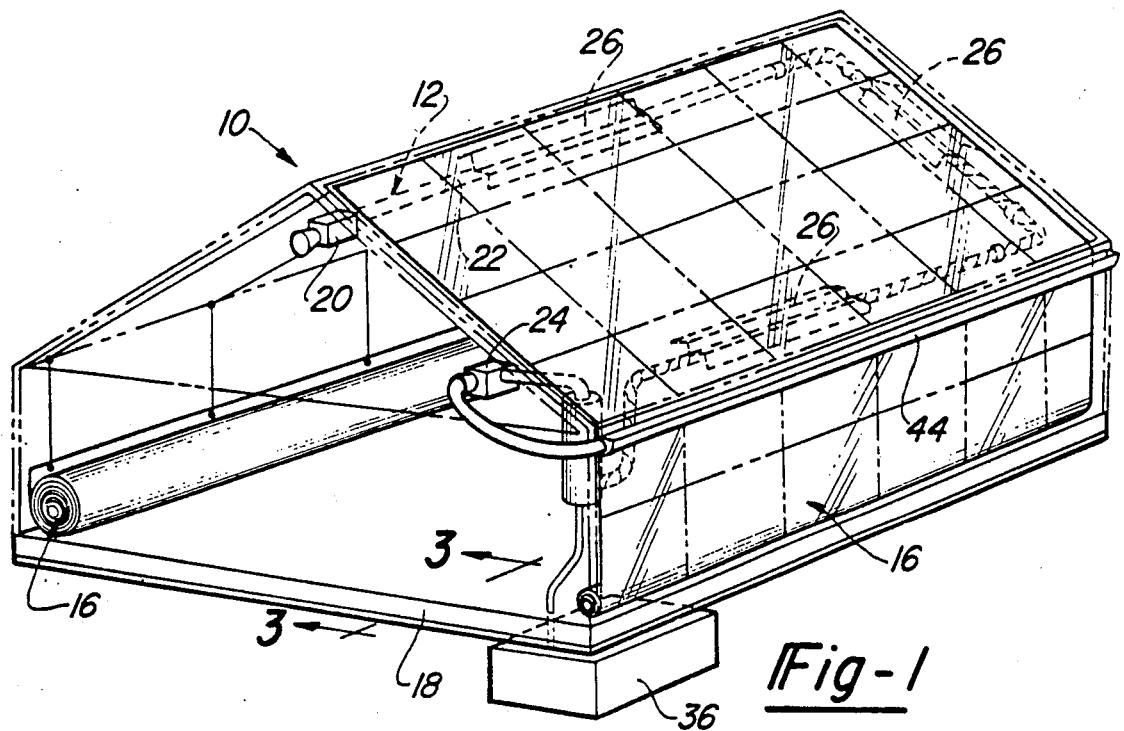
FIG. 1 is a perspective view of a greenhouse incorporating the heating system of the present invention.

FIG. 1 illustrates a greenhouse 10 incorporating the present invention. The greenhouse is a conventional structure which has been modified by installing an infrared heating system 12, an air-to-water heat exchanger 14, a reflective and insulating barrier 16 and a concrete floor 18.

The infrared heater 12 includes a burner 20 that receives gas and air from external supplies (not shown). The burner is connected to a heat disbursement means, in the form of tubular conduit 22, which carries the heated products of combustion into the greenhouse 10 to heat the space within the greenhouse. As exhaust means 24 is connected at the outlet end of the conduit to draw these products of combustion through the tubular conduit 22 and exhaust them to the outside. Exhaust means 24 might, alternatively, be installed at the burner end of the heater to force the products of combustion through the conduit 22 and out of the greenhouse. Reflectors 26 are installed over the conduit 22 to reflect the infrared heat into the greenhouse. Infrared heating systems of this type are commercially available from Combustion Research Corporation.

The infrared heater can optionally include a plurality of smaller burner units (not shown) installed along the length of the conduit 22. Using additional burner units, the temperature of the gasses within the conduit can be maintained at a relatively fixed temperature along the length of the conduit. Under normal operating conditions, the temperature at the burner end of the conduit 22 is approximately 450° F. By ANSI standards, the temperature at the exhaust end of the conduit 22 must be at least 120° F. These requirements do not permit maximum efficiency of the infrared burner because the air exhausted from the conduit is much warmer than the outside air.

Figure 2:
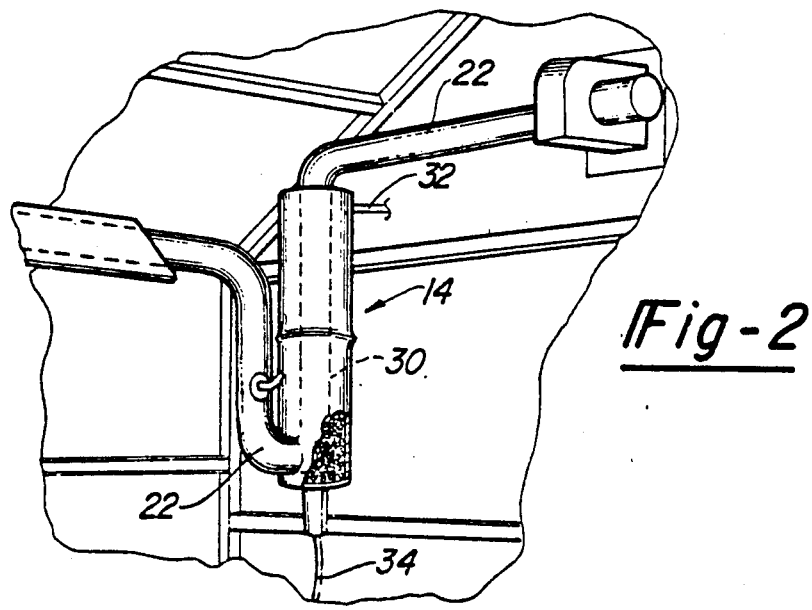
FIG. 2 is a partially cutaway perspective view of the water heater used in the pesent invention.
Figure 3:
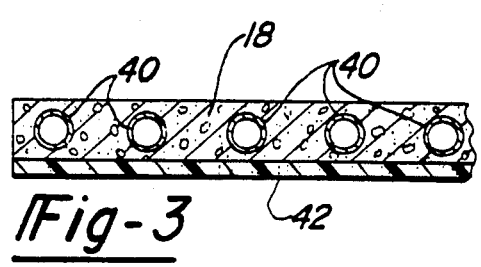
FIG. 3 is a cross sectional view of the floor of the greenhouse of the present invention.

To increase the efficiency of the system, an air-to-water heat exchanger 14 is preferably installed at the exhaust end of the conduit 22. The heat exchanger 14 is shown in detail in FIG. 2. The outer housing 30 of the heat exchanger 14 is in the shape of an elongated cylinder. The housing is mounted vertically with the greenhouse 10. The exhaust end of the conduit 22 enters at the bottom of the housing 30, extends upwards through the center of the housing and exits at the top of the heat exchanger. Water enters the heat exchanger at the top of the housing through pipe 32. Within the housing 30, gravel fills almost the entire area unoccupied by the conduit 22. Water entering at the top of the housing through pipe 32 is filtered by the gravel and exits at the bottom of the heat exchanger through pipe 34. As the water travels from the top of the heat exchanger to the bottom, heat is transferred from the air inside the conduit 22 through the walls of the conduit into the water in the heat exchanger. Consequently, the temperature of the water exiting the heat exchanger is warmed to about 90° F. The temperature of the air exiting the heat exchanger in conduit 22 is cooled to about 60° F.

The heated water exiting the heat exchanger through pipe 34 can be used to water the plants. In the preferred embodiment, the heated water is stored in a large tank 36 below the floor of the greenhouse. The water can then be drawn from the tank using a convention pump (not shown) and sprayed on the plants in the greenhouse.

Under certain conditions, especially when the infrared heater is running much of the time, the temperature of the heated water may rise well above 90° F. In some instances, it may become too warm to be sprayed on the plants without being cooled. To maintain the heated water at a relatively consistent temperature, pipes 40 are installed in the concrete floor which permit the water to circulate from the tank, through the floor, the back into the tank. A valve (not shown) is used to control the circulation of water through the floor. By circulating the water through the floor, heat from the water is transferred into the concrete floor. This has two beneficial effects. First, the water is cooled to maintain a more consistent temperature. Second, in extremely cold weather, the floor of the greenhouse can be heated to increase the comfort level of the greenhouse. In the preferred embodiment, a one inch Styrofoam layer 42 is placed below the concrete floor 18 to create a thermal barrier between the floor 18 and the dirt underlying the greenhouse.

For optimum performance, the infrared heating unit 12 is used in conjunction with a reflective and insulative material 16. In a preferred embodiment, the material 16 is an aluminum coated, two layer plastic film having air pockets between the layers of film. Preferably, the film is selectively deployable over the walls and roof of the greenhouse either in rolls as illustrated in FIG. 1 or venetian blind style as shown and described in U.S. Pat. No. 4,313,650 (Ward et al.), incorporated herein by reference. By deploying or retracting the material 16 at appropriate times, the temperature and amount of light in the greenhouse can be controlled. For example, if a greenhouse in the Northern hemisphere were oriented in a longitudinal east-west direction, the material 16 might be deployed in the following manner. On winter days, the material 16 would be deployed over only the northern roof to reflect sunlight entering through the southern roof down and into the greenhouse. During winter nights, the foil material can be deployed over both roofs to insulate the roofs from heat loss and to reflect light back into the greenhouse. On sumemr days, the foil material can be deployed over only the southern roof to reflect direct sunlight away from the interior of the greenhouse but allow indirect lighting to come into the greenhouse through the northern roof. At night during the summer, the foil material might be retracted completely to prevent excess buildup of heat or, on cooler days, could be deployed over both roofs to reflect light back into the greenhouse.

When the foil material 16 is used in combination with the infrared heating system, the heating efficiency of the system is greatly increased because heat loss through the roof and walls is minimized. When the infrared heating system is used in combination with the foil material 16, the air-to-water heat exchanger 14, and the water circulating pipes 40 within the concrete floor 42, the overall efficiency of the system can reach 98%. My invention, therefore, provides a highly efficient system for maintaining and controlling temperatures and light within a greenhouse so that the greenhouse can be operated year around.

Prior art systems using a heat barrier such as foil 16 encountered problems with ice and snow buildup on the roof of the greenhouse. This difficulty is eliminated, in the present invention, by connecting the exhaust end of the conduit 22 to gutters 44 made of a heat conduit material, e.g. metal. The warm exhaust air is transferred down the length of the gutters 44 melting any snow or ice. I have found that, by keeping the gutters warm, snow and ice from the roof migrate down into the gutters and is carried off. Buildup on the roof is thereby prevented.

I claim:

1. An infrared heating system with a secondary floor level space heater comprising:
   a burner for producing a hot gaseous effluent;
   an infrared energy emitter tube connected to receive the effluent from said burner and adapted to be mounted overhead in an enclosure to be heated;
   exhaust means for venting the effluent from said tube at a relatively low temperature;
   liquid heater means operatively associated with said tube adjacent with the exhaust means to receive waste heat therefrom; and
   liquid conduit means connected to said heater means for conveying heated liquid from said liquid means to the floor area of said enclosure to provide localized heat in said floor area.

2. A greenhouse assembly comprising:
   a floor;
   a superstructure including a roof positioned in spaced relation over said floor to define an enclosure;
   a burner positioned within said enclosure;
   a heat exchanger positioned within said enclosure;
   an infrared energy emitter tube connected at one end to said burner to receive the effluent from said burner, extending within said enclosure in downwardly spaced relation to said roof, and connected at its other end to said heat exchanger to deliver said effluent to said heat exchanger;
   first conduit means for delivering liquid to said heat exchanger for heating by said effluent; and
   further conduit means extending from said heat exchanger and operative to deliver heated liquid from said heat exchanger to said floor to heat said floor.

3. An infrared heating system with a secondary floor level space heater comprising:
   a burner for producing a hot gaseous effluent;
   an infrared energy emitter tube connected at one end to receive the effluent from said burner and adapted to be mounted overhead in an enclosure to be heated;
   exhaust means connected to the other end of said tube for venting the effluent from said tube at a relatively low temperature;
   liquid heater means operatively associated with said tube to receive waste heat therefrom; and
   liquid conduit means connected to said heater means for conveying heated liquid from said liquid heater means to the floor area of said enclosure to provide localized heat in said floor area.

4. A heating system according to claim 3 wherein:
   said liquid heater means comprises a gas to liquid heat exchanger; and
   said liquid conduit means includes a first conduit extending to said heat exchanger from a source of liquid and a further conduit means extending from said heat exchanger to a location proximate the floor of said enclosure.

5. A heating system according to claim 4 wherein:
   said further conduit means includes conduit means adapted to be embedded in the floor of said enclosure.

6. A heating system according to claim 4 wherein:
   said further conduit means includes a storage tank adapted to be positioned beneath the floor of said enclosure;
   a second conduit extending from said heat exchanger to said storage tank; and
   a third conduit extending from said storage tank for embeddment in the floor of said enclosure.

7. A greenhouse assembly according to claim 2 wherein:
   said floor is formed of concrete; and
   said further conduit means includes a storage tank positioned beneath said floor, a second conduit extending from said heat exchanger to said storage tank, and a third conduit extending from said storage tank through said concrete floor to heat said concrete floor.

* * * * *